(12) United States Patent
Green et al.

(10) Patent No.: US 9,817,582 B2
(45) Date of Patent: Nov. 14, 2017

(54) OFFLOAD READ AND WRITE OFFLOAD PROVIDER

(75) Inventors: Dustin L. Green, Redmond, WA (US); Rajeev Nagar, Sammamish, WA (US); Neal R. Christiansen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/345,753

(22) Filed: Jan. 9, 2012

(65) Prior Publication Data
US 2013/0179649 A1 Jul. 11, 2013

(51) Int. Cl.
| | | |
|---|---|---|
| G06F 9/455 | (2006.01) | |
| G06F 9/46 | (2006.01) | |
| G06F 12/08 | (2016.01) | |
| G06F 12/0808 | (2016.01) | |
| G06F 12/0815 | (2016.01) | |
| G06F 3/06 | (2006.01) | |

(52) U.S. Cl.
CPC ............ *G06F 3/0611* (2013.01); *G06F 3/065* (2013.01); *G06F 3/0659* (2013.01); *G06F 3/0673* (2013.01)

(58) Field of Classification Search
CPC ............... G06F 11/2094; G06F 11/277; G06F 11/3051; G06F 12/0866; G06F 12/1458; G06F 12/1466; G06F 17/30351; G06F 17/30283; G06F 17/30348
See application file for complete search history.

(56) References Cited

U.S. PATENT DOCUMENTS

| | | | |
|---|---|---|---|
| 5,043,866 A | 8/1991 | Myre, Jr. et al. | |
| 5,355,477 A | 10/1994 | Strickland et al. | |
| 5,414,841 A | 5/1995 | Bingham et al. | |
| 5,528,594 A | 6/1996 | Butter et al. | |
| 5,668,958 A | 9/1997 | Bendert et al. | |
| 5,678,021 A | 10/1997 | Pawate et al. | |
| 6,141,705 A | 10/2000 | Anand et al. | |

(Continued)

FOREIGN PATENT DOCUMENTS

| | | |
|---|---|---|
| CN | 100343793 C | 10/2007 |
| CN | 101278270 A | 10/2008 |

(Continued)

OTHER PUBLICATIONS

Wang, et al., "Cooperative Cache Management in S2FS", Retrieved at <<http://citeseerx.ist.psu.edu/viewdoc/download?doi=10.1.1.35.4829&rep=rep1&type=pdf>>, In Proceedings of PDPTA, May 10, 1999, pp. 7.

(Continued)

*Primary Examiner* — Daniel C Chappell
*Assistant Examiner* — Mohamed Gebril

(57) ABSTRACT

Aspects of the subject matter described herein relate to an offload provider. In aspects, an offload provider may provide a token that represents data. The offload provider may be expected to ensure that the data the token represents will not change while the token is valid. The offload provider may take actions to ensure the immutability of the data. The actions may be taken, for example, in conjunction with receiving an offload read and/or offload write, and/or in conjunction with receiving another write that, if allowed to proceed, would otherwise change the data represented by the token.

20 Claims, 8 Drawing Sheets

FIG. 1

(56) References Cited

U.S. PATENT DOCUMENTS

| | | | |
|---|---|---|---|
| 6,161,145 A * | 12/2000 | Bainbridge | G06F 9/547 707/999.01 |
| 6,275,867 B1 | 8/2001 | Bendert et al. | |
| 6,304,983 B1 | 10/2001 | Lee et al. | |
| 6,385,701 B1 | 5/2002 | Krein et al. | |
| 6,434,620 B1 | 8/2002 | Boucher et al. | |
| 6,697,881 B2 | 2/2004 | Cochran | |
| 6,785,743 B1 | 8/2004 | Sun et al. | |
| 7,016,982 B2 | 3/2006 | Basham | |
| 7,107,385 B2 | 9/2006 | Rajan et al. | |
| 7,275,139 B1 | 9/2007 | Tormasov et al. | |
| 7,373,548 B2 | 5/2008 | Reinhardt et al. | |
| 7,383,405 B2 | 6/2008 | Vega et al. | |
| 7,406,501 B2 | 7/2008 | Szeto et al. | |
| 7,475,167 B2 | 1/2009 | Wunderlich et al. | |
| 7,475,199 B1 | 1/2009 | Bobbitt | |
| 7,565,526 B1 | 7/2009 | Shaw et al. | |
| 7,567,985 B1 | 7/2009 | Comay et al. | |
| 7,613,786 B2 | 11/2009 | Nakamura et al. | |
| 7,633,955 B1 | 12/2009 | Saraiya et al. | |
| 7,676,607 B2 | 3/2010 | Jung et al. | |
| 7,694,105 B2 | 4/2010 | Sanvido | |
| 7,730,034 B1 | 6/2010 | Deflaux et al. | |
| 7,730,231 B2 | 6/2010 | Weisser et al. | |
| 7,801,852 B2 | 9/2010 | Wong et al. | |
| 7,804,862 B1 * | 9/2010 | Olson | G06F 13/126 370/546 |
| 7,814,058 B2 | 10/2010 | Beck | |
| 7,831,720 B1 | 11/2010 | Noureddine et al. | |
| 7,886,115 B2 | 2/2011 | Sanvido et al. | |
| 7,890,717 B2 | 2/2011 | Tsuboki et al. | |
| 7,895,445 B1 | 2/2011 | Albanese | |
| 8,042,163 B1 | 10/2011 | Karr et al. | |
| 8,082,231 B1 | 12/2011 | McDaniel et al. | |
| 8,086,585 B1 | 12/2011 | Brashers et al. | |
| 8,213,583 B2 | 7/2012 | Finogenov | |
| 8,239,674 B2 * | 8/2012 | Lee | G06F 21/6218 713/165 |
| 8,250,267 B2 | 8/2012 | Logan | |
| 8,261,005 B2 * | 9/2012 | Flynn | G06F 1/183 711/103 |
| 8,261,267 B2 | 9/2012 | Iwamatsu et al. | |
| 8,332,370 B2 | 12/2012 | Gattegno et al. | |
| 2002/0019788 A1 | 2/2002 | Stehle et al. | |
| 2002/0038296 A1 | 3/2002 | Margolus et al. | |
| 2002/0178335 A1 | 11/2002 | Selkirk et al. | |
| 2002/0198788 A1 | 12/2002 | Moskowitz et al. | |
| 2003/0058238 A1 | 3/2003 | Doak et al. | |
| 2004/0049603 A1 | 3/2004 | Boyd et al. | |
| 2004/0153451 A1 | 8/2004 | Phillips et al. | |
| 2004/0205202 A1 | 10/2004 | Nakamura et al. | |
| 2004/0267672 A1 | 12/2004 | Gray et al. | |
| 2005/0131875 A1 | 6/2005 | Riccardi et al. | |
| 2006/0218544 A1 | 9/2006 | Chakraborty et al. | |
| 2006/0230222 A1 | 10/2006 | Yamagami | |
| 2006/0294234 A1 | 12/2006 | Bakke et al. | |
| 2007/0055702 A1 * | 3/2007 | Fridella | G06F 17/30194 |
| 2007/0260831 A1 | 11/2007 | Michael et al. | |
| 2008/0065835 A1 * | 3/2008 | Iacobovici et al. | 711/141 |
| 2008/0104039 A1 | 5/2008 | Lowson | |
| 2008/0120470 A1 | 5/2008 | Dhamankar et al. | |
| 2008/0128484 A1 | 6/2008 | Spaeth et al. | |
| 2008/0140910 A1 | 6/2008 | Flynn et al. | |
| 2008/0147755 A1 | 6/2008 | Chapman | |
| 2008/0147961 A1 | 6/2008 | Seki et al. | |
| 2008/0155051 A1 | 6/2008 | Moshayedi | |
| 2008/0155223 A1 | 6/2008 | Hiltgen et al. | |
| 2008/0184273 A1 | 7/2008 | Sekar | |
| 2008/0235479 A1 | 9/2008 | Scales et al. | |
| 2008/0282337 A1 | 11/2008 | Crawford | |
| 2009/0172665 A1 | 7/2009 | Tene et al. | |
| 2009/0198731 A1 | 8/2009 | Noonan, III | |
| 2009/0248835 A1 | 10/2009 | Panda et al. | |
| 2009/0249001 A1 | 10/2009 | Narayanan et al. | |
| 2009/0282101 A1 | 11/2009 | Lim et al. | |
| 2009/0300301 A1 * | 12/2009 | Vaghani | G06F 3/061 711/162 |
| 2009/0327621 A1 | 12/2009 | Kliot et al. | |
| 2010/0042796 A1 | 2/2010 | Vasilevsky et al. | |
| 2010/0058021 A1 | 3/2010 | Kawamura | |
| 2010/0070725 A1 | 3/2010 | Prahlad et al. | |
| 2010/0083276 A1 | 4/2010 | Green et al. | |
| 2010/0094806 A1 | 4/2010 | Apostolides et al. | |
| 2010/0115184 A1 | 5/2010 | Chang | |
| 2010/0115208 A1 | 5/2010 | Logan | |
| 2010/0122248 A1 | 5/2010 | Robinson et al. | |
| 2010/0146190 A1 | 6/2010 | Chang | |
| 2010/0228913 A1 | 9/2010 | Czezatke et al. | |
| 2010/0235831 A1 | 9/2010 | Dittmer | |
| 2010/0241785 A1 | 9/2010 | Chen et al. | |
| 2010/0250630 A1 | 9/2010 | Kudo | |
| 2010/0306467 A1 | 12/2010 | Pruthi et al. | |
| 2010/0325441 A1 | 12/2010 | Laurie et al. | |
| 2011/0055406 A1 | 3/2011 | Piper et al. | |
| 2011/0072059 A1 | 3/2011 | Guarraci | |
| 2011/0075557 A1 | 3/2011 | Chowdhury et al. | |
| 2011/0197022 A1 | 8/2011 | Green et al. | |
| 2011/0214172 A1 | 9/2011 | Hermann et al. | |
| 2012/0079229 A1 | 3/2012 | Jensen et al. | |
| 2012/0079583 A1 | 3/2012 | Christiansen et al. | |
| 2012/0110281 A1 | 5/2012 | Green et al. | |
| 2012/0144501 A1 | 6/2012 | Vangpat et al. | |
| 2012/0233434 A1 | 9/2012 | Starks et al. | |
| 2012/0233682 A1 | 9/2012 | Finogenov | |
| 2012/0324560 A1 | 12/2012 | Matthew et al. | |
| 2013/0041985 A1 | 2/2013 | Christiansen et al. | |
| 2013/0179959 A1 | 7/2013 | Green et al. | |
| 2014/0164571 A1 | 6/2014 | Green | |
| 2014/0172811 A1 | 6/2014 | Green | |
| 2016/0019004 A1 | 1/2016 | Starks et al. | |
| 2016/0335023 A1 | 11/2016 | Starks et al. | |

FOREIGN PATENT DOCUMENTS

| | | |
|---|---|---|
| CN | 101313278 A | 11/2008 |
| CN | 101554011 A | 10/2009 |
| CN | 101572660 A | 11/2009 |
| CN | 101622596 A | 1/2010 |
| EP | 2262164 A1 | 12/2010 |
| JP | 06268715 | 9/1994 |
| JP | 2008146574 | 6/2008 |
| JP | 2010-033206 | 2/2010 |
| JP | 2010055557 | 3/2010 |
| WO | WO 2008/070811 | 6/2008 |
| WO | WO 2009/146001 | 12/2009 |
| WO | WO 2012/039939 | 3/2012 |

OTHER PUBLICATIONS

"ControlSphere Token data structure", Retrieved at <<http://www.securesystems.lv/HelpSystem/TokenDataManager.htm>>, Retrieved Date: Nov. 18, 2011, pp. 10.

"Offload Reads and Writes", 12888433, Filed Date: Sep. 23, 2010, pp. 78.

"Virtualization and Offload Reads and Writes", 12938383, Filed Date: Nov. 3, 2010, pp. 91.

"Token Data Operations", 13162592, Filed Date: Jun. 17, 2011, pp. 29.

"Token Based File Operations", 13207014, Filed Date: Aug. 10, 2011, pp. 37.

"Zero Token", 13343718, Filed Date: Jan. 5, 2012, pp. 57.

"Virtual Disk Storage Techniques", U.S. Appl. No. 13/046,617, Filed Date: Mar. 11, 2011, pp. 63.

U.S. Appl. No. 13/162,592, Amendment and response filed Apr. 4, 2014, 12 pgs.

U.S. Appl. No. 12/938,383, Office Action dated Mar. 14, 2014, 31 pgs.

U.S. Appl. No. 12/888,433, Office Action dated Mar. 28, 2014, 15 pgs.

U.S. Appl. No. 13/343,718, Amendment and Response filed Feb. 25, 2014, 12 pgs.

(56) References Cited

OTHER PUBLICATIONS

U.S. Appl. No. 13/343,718, Office Action dated Mar. 20, 2014, 20 pgs.
Chinese 1st Office Action in Application 201110343154.7, dated Jan. 22, 2014, 10 pgs.
Chinese 1st Office Action in Application 201110285468.6, dated Jan. 30, 2014, 16 pgs.
"Compatible Extending Offload Token Size", U.S. Appl. No. 13/714,413, filed Dec. 14, 2012, 69 pgs.
"Copy Offload for Disparate Offload Providers", U.S. Appl. No. 13/711,637, filed Dec. 12, 2012, 70 pgs.
U.S. Appl. No. 13/046,617, Amendment and Response filed Jan. 21, 2014, 10 pgs.
U.S. Appl. No. 13/162,592, Office Action dated Dec. 4, 2013, 15 pgs.
U.S. Appl. No. 13/207,014, Office Action dated Jan. 16, 2014, 16 pgs.
Wikipedia, Universally Unique Identifier (UUID), located online at: http://en.wikipedia.org/wiki/Universally_unique_identifier, on Nov. 27, 2013, 2 pgs.
Wu et al., "Distributed Runtime Load-Balancing for Software Routers on Homogeneous Many-Core Processors", retrieved at: http://conferences.sigcomm.org/co-next/2010/Workshops/PRESTO_papers/01-Wu.pdf, Proc. of the ACM context workshop on programmable routers for extensible services of tomorrow (PRESTO), Nov. 30, 2011, 6 pgs.
U.S. Appl. No. 12/938,383, Amendment and Response filed Nov. 19, 2013, 14 pgs.
U.S. Appl. No. 13/343,718, Amendment and Response filed Sep. 30, 2013, 12 pgs.
U.S. Appl. No. 13/343,718, Office Action dated Nov. 25, 2013, 17 pgs.
European Official Communication in Application 12756990.3, dated Oct. 18, 2013, 2 pgs.
European Communication and EESR in Application 12756990.3, dated Jul. 18, 2014, 8 pgs.
European Communication in Application 12756990.3, dated Aug. 5, 2014, 1 page.
U.S. Appl. No. 12/938,383, Office Action dated Aug. 14, 2014, 31 pgs.
U.S. Appl. No. 13/714,413. Office Action dated Aug. 13, 2014, 12 pgs.
Australian Office Action in Application 2011305839, dated Apr. 4, 2014, 3 pgs.
PCT International Search Report in International Application PCT/US2013/074509, dated Mar. 28, 2014, 12 pgs.
PCT International Search Report in International Application PCT/US2013/075212, dated Apr. 25, 2014, 10 pgs.
U.S. Appl. No. 13/207,014, Amendment and Response filed Apr. 16, 2014, 14 pgs.
U.S. Appl. No. 13/162,592, Office Action dated May 28, 2014, 15 pgs.
Walla, "Kerberos Explained", Windows 2000 Advantage magazine, Microsoft Technet, May 2000, 6 pgs.
U.S. Appl. No. 12/938,383, Amendment and Response filed Jul. 14, 2014, 15 pgs.
Australian Office Action in Application 2011305839, dated Jul. 2, 2014, 4 pgs.
U.S. Appl. No. 12/938,383, Amendment and Response filed Nov. 14, 2014, 15 pgs.
U.S. Appl. No. 13/046,617, Office Action dated Nov. 20, 2014, 7 pgs.
U.S. Appl. No. 13/714,413, Office Action dated Dec. 15, 2014, 9 pgs.
U.S. Appl. No. 13/162,592, Office Action dated Jan. 27, 2015, 13 pgs.
Chinese 2nd Office Action in Application 201110343154.7, dated Sep. 23, 2014, 18 pgs.
Chinese 2nd Office Action in Application 201110285468.6, dated Sep. 30, 2014, 22 pgs.
U.S. Appl. No. 13/711,637, Office Action dated Sep. 23, 2014, 6 pgs.
U.S. Appl. No. 13/714,413, Amendment and Response filed Oct. 9, 2014, 11 pgs.
U.S. Appl. No. 13/162,592, Amendment and response filed Oct. 28, 2014, 12 pgs.
U.S. Appl. No. 13/711,637, Amendment and Response filed Oct. 14, 2014, 8 pgs.
U.S. Appl. No. 13/711,637, Notice of Allowance dated Nov. 3, 2014, 8 pgs.
PCT Written Opinion in International Application PCT/US2013/075212, dated Oct. 22, 2014, 6 pgs.
U.S. Appl. No. 12/938,383, Notice of Allowance dated Mar. 11, 2015, 10 pgs.
U.S. Appl. No. 13/207,014, Office Action dated Mar. 5, 2015, 19 pgs.
U.S. Appl. No. 13/711,637, Notice of Allowance dated Mar. 3, 2015, 8 pgs.
U.S. Appl. No. 13/714,413, Amendment and Response filed Feb. 20, 2015, 14 pgs.
U.S. Appl. No. 13/162,592, Amendment and response filed Apr. 27, 2015, 12 pgs.
U.S. Appl. No. 13/046,617, Amendment and Response filed May 8, 2015, 9 pgs.
U.S. Appl. No. 13/046,617, Notice of Allowance dated May 22, 2015, 7 pgs.
U.S. Appl. No. 13/714,413, Notice of Allowance dated Jun. 3, 2015, 13 pgs.
Czap, Laszlo et al., Secure Key Exchange in Wireless Networks, 2011, IEEE, 6 pages.
U.S. Appl. No. 13/207,014, Amendment and Response filed Jun. 5, 2015, 14 pgs.
European Supplementary Search Report in Application 12821531.6, dated Feb. 13, 2015, 7 pgs.
European Communication in Application 12821531.6, dated Mar. 3, 2015, 1 page.
Chinese 3rd Office Action in Application 201110343154.7, dated Mar. 24, 2015, 7 pgs.
U.S. Appl. No. 13/162,592, Office Action dated Jun. 18, 2015, 14 pgs.
Japanese Notice of Rejection in Application 2013-530171, dated Apr. 16, 2015, 3 pgs.
Chinese 1st Office Action in Application 201280039140.9, dated Aug. 5, 2015, 14 pgs.
European Communication in Application 13818561.6, dated Jul. 21, 2015, 2 pgs.
Taiwanese Office Action and Search Report in Application 100128753, dated Jul. 13, 2015, 8 pgs.
U.S. Appl. No. 13/207,014, Office Action dated Aug. 12, 2015, 20 pgs.
European Communication in Application 13821245.1, dated Jul. 24, 2015, 2 pgs.
U.S. Appl. No. 13/714,413, Notice of Allowance dated Sep. 24, 2015, 12 pgs.
Chinese 4th Office Action in Application 201110343154.7, dated Oct. 9, 2015, 6 pgs.
Chinese Notice of Allowance in Application 201110343154.7, dated Jan. 25, 2016, 4 pgs.
Japanese Office Action in Application 2013-557777, dated Mar. 1, 2016, 12 pgs.
U.S. Appl. No. 14/867,254, Office Action dated Mar. 28, 2016, 9 pgs.
European Office Action in Application 13821245.1, dated Apr. 26, 2016, 4 pgs.
Chinese 1st Office Action and Search Report Issued in Chinese Patent Application No. 201210060920.3, dated Dec. 4, 2015, 25 Pages.
Wu, et al., "Study on Storage Virtualization", In Journal of Chinese Mini-Micro Computer Systems, vol. 24, No. 4, Apr. 30, 2003, pp. 728-732.
Chinese 2nd Office Action in Application No. 201210060920.3, dated Jul. 20, 2016, 11 pgs.

(56) References Cited

OTHER PUBLICATIONS

Australian Office Action in Application 2012294797, dated Aug. 26, 2016, 3 pgs.
Chinese 3rd Office Action in Application 20121006092.3, dated Nov. 6, 2016, 5 pgs.
Japanese Notice of Allowance in Application 2013-557777, dated Oct. 25, 2016, 3 pgs. (No English translation).
Chinese Notice of Allowance in Application 201210060920.3, dated Jan. 12, 2017, 4 pages.
"Disk cache infrastructure enhancements", Retrieved at <<http://publib.boulder.ibm.com/infocenter/wasinfo/v6r1/index.jsp?topic=/com.ibm.websphere.express.doc/info/exp/ae/cdyn_diskcacheenhance.html>>, Jun. 15, 2010, 2 pgs.
"Saving and Restoring ZFS Data", Retrieved at <<http://docs.huihoo.com/opensolaris/solaris-zfs-administration-guide/html/ch06s03.html>>, Jun. 13, 2008, 3 pgs.
Agarwal, "Distributed Checkpointing of Virtual Machines in Xen Framework", Thesis Submitted in Partial Fulfillment of the Requirements for the Degree of Master of Technology in Computer Science and Engineering, Department of Computer Science and Engineering, Indian Institute of Technology, Kharagpur, May 2008, 1-44.
Bandulet, Christian, "Object-Based Storage Devices", Retrieved at <<http://developers.sun.com/solaris/articles/ osd.html>>, Jul. 2007, 7 pgs.
Campbell, Lisa, "Hyper-V Scalability Evident in Its New Virtual Disk Format", Published on: Jul. 9, 2012, Available at: http://www.unitrends.com/hyper-v-backup/hyper-vscalability-evident-virtual-disk-format/.
Dean, Randall W. et al., "Data Movement in Kernelized Systems", Retrieved at << http://citeseerx.ist.psu.edu/viewdoc/download?3 doi=10.1.1.56.4419&rep=rep1 &type=pdf >>, Proceedings of the Workshop on Micro-kernels and Other Kernel Architectures, 1992, 22 pgs.
Dell, "Automated, Integrated, and Scalable Protection of Virtual Machines", Retrieved at <<http://www.dell.com/downloads/global/products/pvaul/en/equallogicys_vmware_asmve_specsheet.pdf >> Retrieved Date: Jul. 26, 2010, 2 pgs.
Deploying Virtual Hard Disk Images, www.technet.microsoft.com-en-us-librarydd363560(WS.1O,printer).aspx, accessed Dec. 8, 2010, 1-8.
Devulapalli, et al., "Design of an Intelligent Object-based Storage device", Retrieved at <<http://www.osc.edu/ research/network_file/projects/object/papers/istor-tr.pdf>> , retrieved date: Jul. 5, 2010, 12 pgs.
Elnozahy et al., "The performance of Consistent Checkpointing", 11th Symposium on Reliable Distributed Systems, Houston, TX, USA, Oct. 5-7, 1992, 39-47.
Eshel et al. "Panache: A Parallel File System Cache for Global File Access", Feb. 2010, 14 pages.
European Official Communication in Application 11827196.4, dated May 2, 2013, 2 pgs.
FSCTL_FILE_LEVEL_Trim Control Code, Retrieved on: Jul. 11, 2012, Available at: http://msdn.microsoft. com/en-us/library/windows/hardware/hh451 098(v=vs.85).aspx.
How to Resize a Microsoft Virtual Hard Drive (VHD), http:--sysadmingeek.com-articleshow-to-resize-a-microsoft-virtual-hard-drive-vhd-file-, accessed Jan. 24, 2011, 1-10.
International Patent Application No. PCT/US2011/055586, International Search Report dated May 31, 2012, 8 pages.
International Patent Application No. PCT/US2011/055591, International Search Report dated May 31, 2012, 8 pages.
International Patent Application No. PCT/US2012/027645: International Search Report and Written Opinion dated Sep. 25, 2012, 9 pages.
International Search Report, dated Apr. 9, 2012, Application No. PCT/US2011/050739, Filed Date: Sep. 7, 2011, 9 pages.
Jarvinen et al., "Embedded SFE: Offloading Server and Network Using Hardware Tokens", Jan. 2010, 21 pgs.
Kerr, "The Virtual Disk API in Windows 7", http:--msdn.microsoft.com-en-us-magazinedd569754.aspx, accessed Feb. 23, 2011, 1-7.
Lachaize, Renaud et al., "A Distributed Shared Buffer Space for Data-intensive Applications", Retrieved at<< http://1 ieeexplore.ieee.org/stamp/stamp.jsp?tp=&arnumber=1558659 >>, Proceedings of the Fifth IEEE International Symposium on Cluster Computing and the Grid, vol. 2, 2005, pp. 913-920.
Leser, Towards a Worldwide Distributed File System, Sep. 27, 1990, 13 pages.
Narayanan, D. et al., "Write Off-Loading: Practical Power Management for Enterprise Storage", Retrieved at <<http:// research.microsoft.com/en-us/um/people/antr/MS/fast08.pdf>> Feb. 2008, ACM Transactions on Storage (TOS), vol. 04, No. 3, 15 pages.
PCT International Search Report and Written Opinion in Application PCT/US2012/047261, dated Jan. 31, 2013, 8 pgs.
PCT Preliminary Report on Patentability, dated Mar. 26, 2013, in Application PCT/US2011/050739, 6 pgs.
Storage_Offload_Token structure, Retrieved at <<http://msdn.microsofl.com/en-us/library/windows/hardware/hh451469%28v=vs.85%29.aspx>>, Retrieved Date: Sep. 7, 2011, 2 Pages.
TRIM/UNMAP Support in Windows Server 2012 & Hyper-VNHDX, Published on: May 23, 2012, Available at: http://workinghardinit.wordpress.com/20 12/05/23/trimunmap-support-inwindows-serve r-20 12-hyper -vvhdx/.
Troubleshooting Parent Virtual Disk Errors in Fusion, http:--kb.vmware.com-selfservicemicrosites-search.do?language=en_US &cmd=displayKC&externalId=1018832, accessed Feb. 23, 2011, 1-7.
U.S. Appl. No. 12/888,433, Amendment and Response filed Feb. 27, 2013, 12 pgs.
U.S. Appl. No. 12/888,433, Amendment and Response filed Aug. 8, 2013, 12 pgs.
U.S. Appl. No. 12/888,433, Office Action dated Nov. 27, 2012, 13 pgs.
U.S. Appl. No. 12/888,433, Office Action dated May 8, 2013, 14 pgs.
U.S. Appl. No. 12/938,383, Office Action dated Aug. 19, 2013, 26 pgs.
U.S. Appl. No. 13/046,617, Office Action dated Aug. 19, 2013, 6 pgs.
U.S. Appl. No. 13/207,014, Amendment and Response filed Sep. 24, 2013, 10 pgs.
U.S. Appl. No. 13/207,014, Office Action dated Jun. 24, 2013, 15 pgs.
U.S. Appl. No. 13/343,718, Office Action dated May 30, 2013, 16 pgs.
Using Differencing Disks, www.technet.microsoft.com-en-us-library-cc720381(WS.1O,printer).aspx, accessed Dec. 8, 2010, 1-3.
Virtual Hard Disk Image Format Specification, Microsoft Corporation, Oct. 11, 2006, 1-8.
VMWare Recovering Vmware Snapshot after Parent Changed, http:--itit-larsen.dkindex.php?option=com_content&view=article &id=6:vmware-recovering-vmware-snapshotafter-parent-changed &catid=1 :vmware-35<emid=4, accessed Feb. 23, 2011, 1-3.
Wang, Cheng et al., "A Computation Offloading Scheme on Handheld Devices", Retrieved at << http://citeseerx.ist.psu.edu/2 viewdoc/download?doi=10.1.1.66.9721 &rep=rep1 &type=pdf >>, Journal of Parallel and Distributed Computing, vol. 64, No. 6, Jun. 2004, pp. 740-746.
What pv technology means in vSphere, Retrieved at<< http://www.lusovirt.com/wordpress/?p=5 >>, Jan. 30, 2010, 7 pgs.
Yang et al., "Windows Server 2008", Virtual Hard Disk Performance, A Microsoft White Paper, Mar. 2010, 1-35.
Microsoft, "Offloaded Data Transfer (ODX) with Intelligent Storage Arrays", Feb. 28, 2012, 14 pgs.
Hong Kong Notice of Grant in Application 12111240.1, dated Jul. 14, 2017, 1 page.

\* cited by examiner

OFFLOAD READ AND WRITE OFFLOAD PROVIDER

BACKGROUND

One mechanism for transferring data is to read the data from a file of a source location into main memory and write the data from the main memory to a destination location. While in some environments, this may work acceptably for relatively little data, as the data increases, the time it takes to read the data and transfer the data to another location increases. In addition, if the data is accessed over a network, the network may impose additional delays in transferring the data from the source location to the destination location. Furthermore, security issues combined with the complexity of storage arrangements may complicate data transfer.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to an offload provider. In aspects, an offload provider may provide a token that represents data. The offload provider may be expected to ensure that the data the token represents will not change while the token is valid. The offload provider may take actions to ensure the immutability of the data. The actions may be taken, for example, in conjunction with receiving an offload read and/or offload write, and/or in conjunction with receiving another write that, if allowed to proceed, would otherwise change the data represented by the token.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
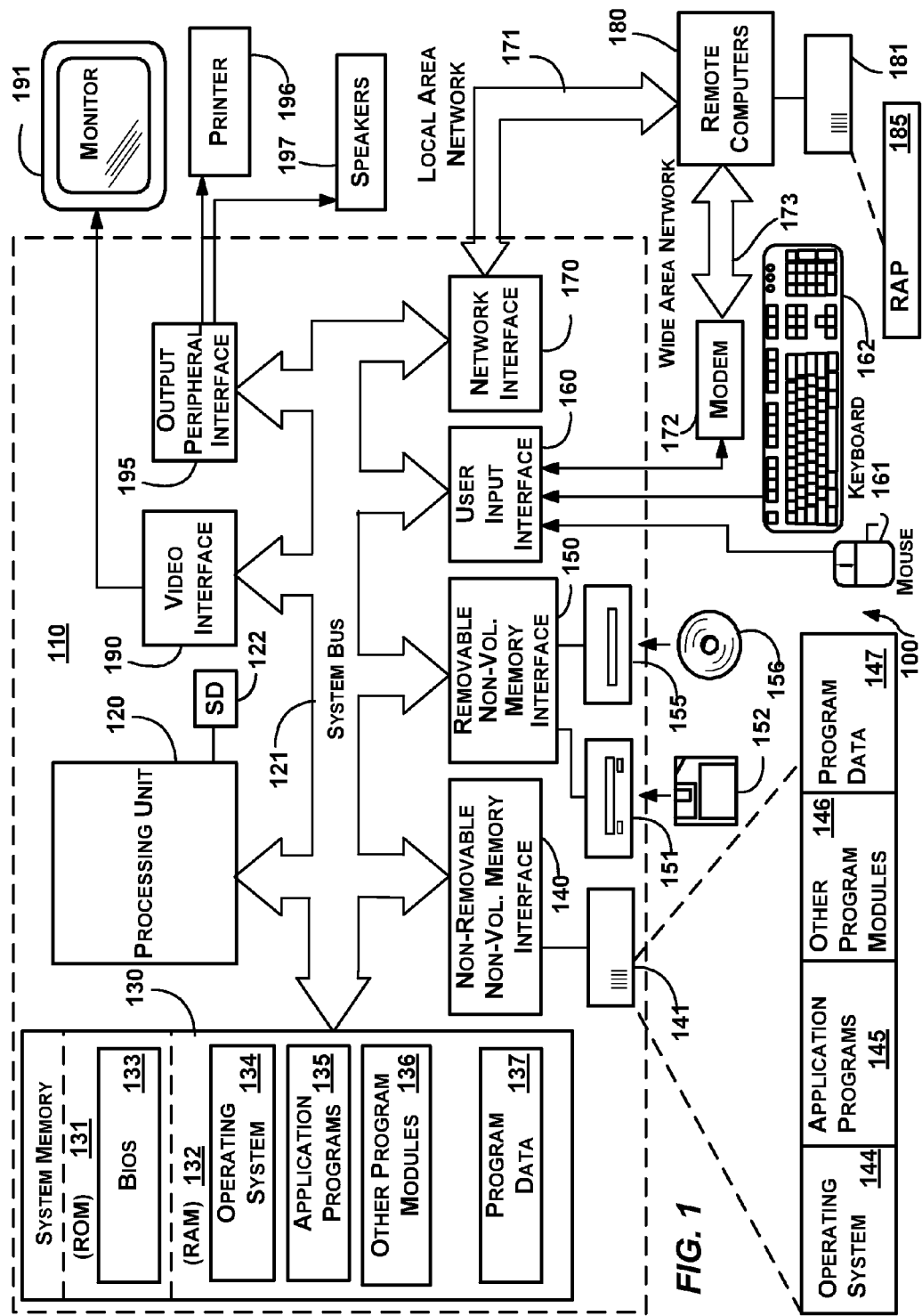
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device (SD) 122. The security device (SD) 122 may store and be able to generate cryptographic keys that may be used to secure various aspects of the computer 110. In one embodiment, the security device (SD) 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs (RAP) 185 as residing on memory device 181. It will be appreciated that the network connections shown are exemplary and other means of establishing a communications link between the computers may be used.

Offload Reads and Writes

As mentioned previously, some traditional data transfer operations may not be efficient or even work in today's storage environments.

FIGS. 2-5 are block diagrams that represent exemplary arrangements of components of systems in which aspects of the subject matter described herein may operate. The components illustrated in FIGS. 2-5 are exemplary and are not meant to be all-inclusive of components that may be needed or included. In other embodiments, the components and/or functions described in conjunction with FIGS. 2-5 may be included in other components (shown or not shown) or placed in subcomponents without departing from the spirit or scope of aspects of the subject matter described herein. In some embodiments, the components and/or functions described in conjunction with FIGS. 2-5 may be distributed across multiple devices.

Figure 2:
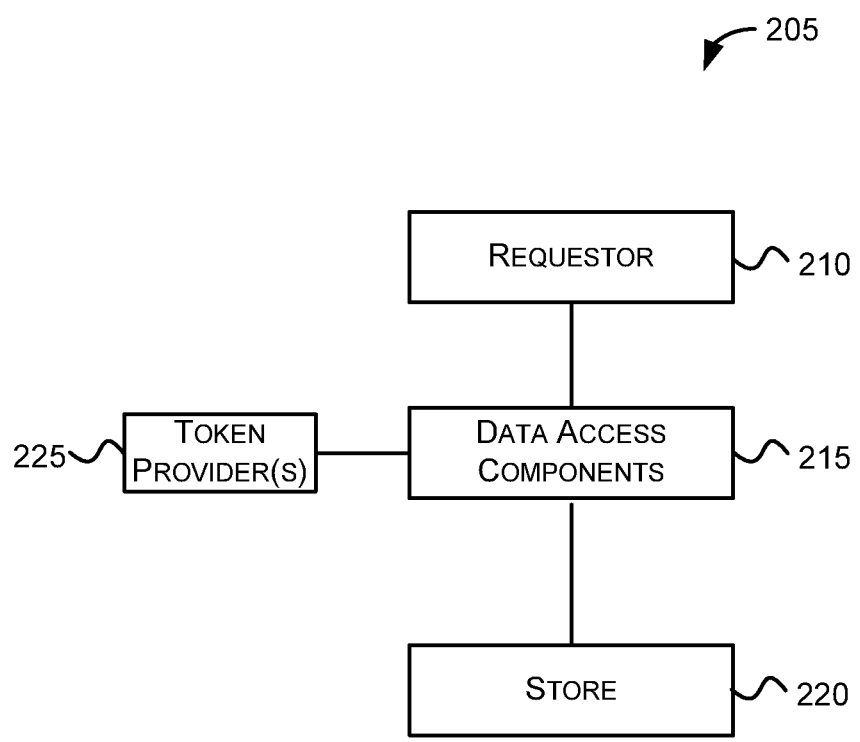
FIGS. 2-5 are block diagrams that represent exemplary arrangements of components of systems in which aspects of the subject matter described herein may operate.

Turning to FIG. 2, the system 205 may include a requestor 210, data access components 215, token provider(s) 225, a store 220, and other components (not shown). The system 205 may be implemented via one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

Where the system 205 comprises a single device, an exemplary device that may be configured to act as the system 205 comprises the computer 110 of FIG. 1. Where the system 205 comprises multiple devices, one or more of the multiple devices may comprise the computer 110 of FIG. 1 where the multiple devices may be configured similarly or differently.

The data access components 215 may be used to transmit data to and from the store 220. The data access components 215 may include, for example, one or more of: I/O managers, filters, drivers, file server components, components on a storage area network (SAN) or other storage device, and other components (not shown). As used herein, a SAN may be implemented, for example, as a device that exposes logical storage targets, as a communication network that includes such devices, or the like.

In one embodiment, a data access component may comprise any component that is given an opportunity to examine I/O between the requestor 210 and the store 220 and that is capable of changing, completing, or failing the I/O or performing other or no actions based thereon. For example, where the system 205 resides on a single device, the data access components 215 may include any object in an I/O stack between the requestor 210 and the store 220. Where the system 205 is implemented by multiple devices, the data access components 215 may include components on a device that hosts the requestor 210, components on a device that provides access to the store 220, and/or components on other devices and the like. In another embodiment, the data access components 215 may include any components (e.g., such as a service, database, or the like) used by a component through which the I/O passes even if the data does not flow through the used components.

As used herein, the term component is to be read to include hardware such as all or a portion of a device, a collection of one or more software modules or portions thereof, some combination of one or more software modules or portions thereof and one or more devices or portions thereof, and the like. A component may include or be represented by code.

As used herein, the terms data and physical data are to be read to include physical data storage locations of the store, and the terms sharing data and sharing of data and sharing of physical data are to be read to include sharing of physical data storage locations of the store.

In one embodiment, the store 220 is any storage media capable of storing data. The store 220 may include volatile memory (e.g., a cache) and nonvolatile memory (e.g., a persistent storage). The term data is to be read broadly to include anything that may be represented by one or more computer storage elements. Logically, data may be represented as a series of 1's and 0's in volatile or nonvolatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, commands, other data, or the like.

The store 220 may comprise hard disk storage, solid state, or other nonvolatile storage, volatile memory such as RAM, other storage, some combination of the above, and the like and may be distributed across multiple devices (e.g., multiple SANs, multiple file servers, a combination of heterogeneous devices, and the like). The devices used to implement the store 220 may be located physically together (e.g., on a single device, at a datacenter, or the like) or distributed geographically. The store 220 may be arranged in a tiered storage arrangement or a non-tiered storage arrangement. The store 220 may be external, internal, or include components that are both internal and external to one or more devices that implement the system 205. The store 220 may be formatted (e.g., with a file system) or non-formatted (e.g., raw).

In another embodiment, the store 220 may be implemented as a storage container rather than as direct physical storage. A storage container may include, for example, a file, volume, disk, virtual disk, logical unit, logical disk, writable clone, volume snapshot, logical disk snapshot, physical disk, solid state storage (SSD), hard disk, data stream, alternate data stream, metadata stream, or the like. For example, the store 220 may be implemented by a server having multiple physical storage devices. In this example, the server may present an interface that allows a data access component to access data of a store that is implemented using one or more of the physical storage devices or portions thereof of the server.

The level of abstraction may be repeated to any arbitrary depth. For example, the server providing a storage container to the data access components 215 may also rely on a storage container to access data.

In another embodiment, the store 220 may include a component that provides a view into data that may be persisted in nonvolatile storage or not persisted in nonvolatile storage.

Figure 3:
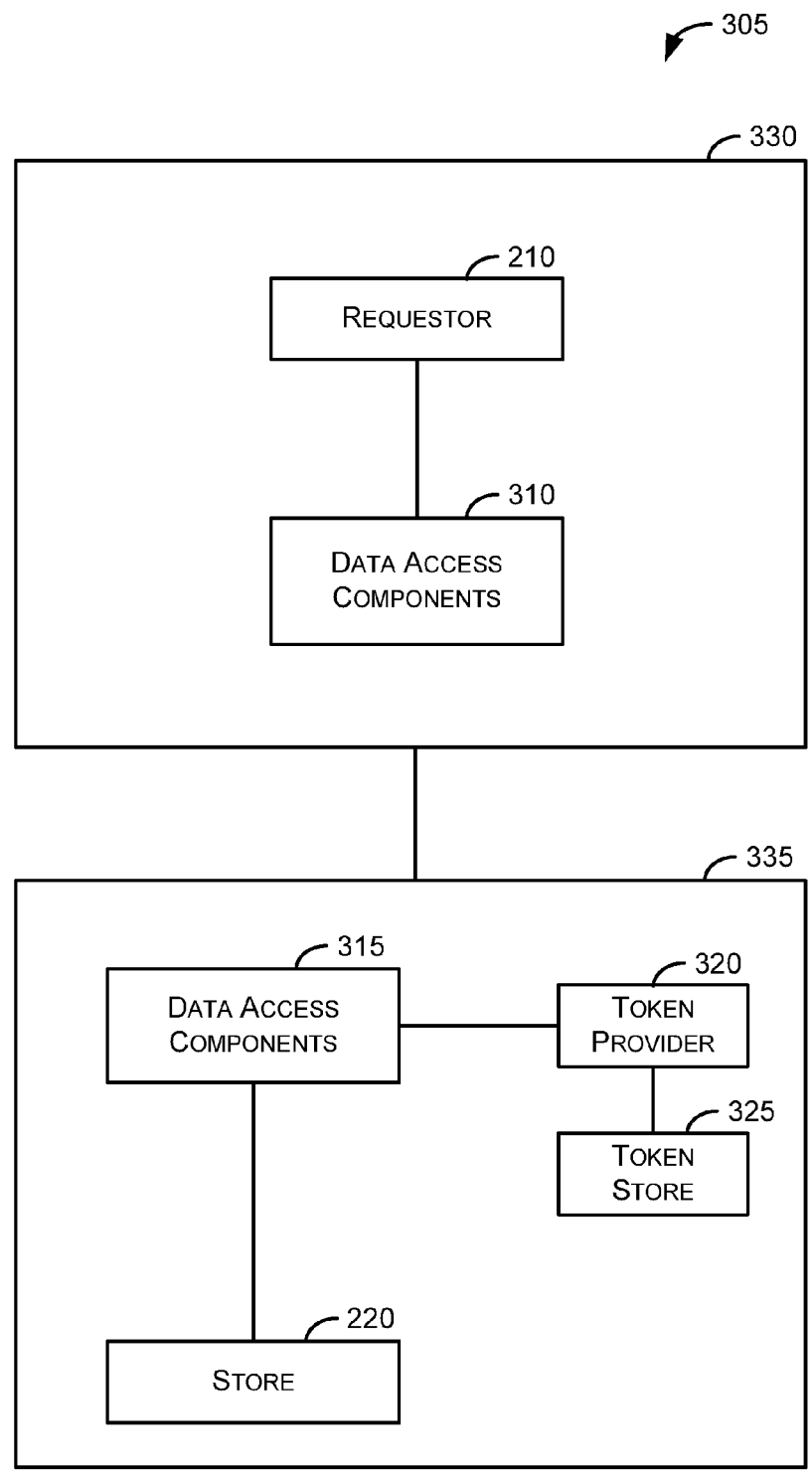

One or more of the data access components 215 may reside on an apparatus that hosts the requestor 210 while one or more other of the data access components 215 may reside on an apparatus that hosts or provides access to the store 220. For example, if the requestor 210 is an application that executes on a personal computer, one or more of the data access components 215 may reside in an operating system hosted on the personal computer. An example of this is illustrated in FIG. 3.

As another example, if the store 220 is implemented by a storage area network (SAN), one or more of the data access components 215 may implement a storage operating system that manages and/or provides access to the store 220. When the requestor 210 and the store 220 are hosted in a single apparatus, all or many of the data access components 215 may also reside on the apparatus.

An offload read allows a requestor to obtain a token that represents data of a store. Using this token, the requestor or another requestor may request an offload write. An offload write allows a requestor to cause an offload provider to write some or all of the data represented by the token.

An offload provider is an entity (possibly including multiple components spread across multiple devices) that provides indirect access to data associated with a token. Logically, an offload provider is capable of performing an offload read and/or offload write. Physically, an offload provider may be implemented by one or more of the data access components 215 and a token provider.

In servicing an offload read or offload write, an offload provider may logically perform operations on the data of the store and/or on tokens associated with a token provider. For example, for an offload read, an offload provider may logically copy data from a logical storage container backed by data of a store into a token (which may also be backed by data of the store), while for an offload write, the offload provider may logically copy data from a token to a logical storage container backed by data of the store.

An offload provider may transfer data from a source store, write data to a destination store, and maintain data to be provided upon receipt of a token associated with the data. In some implementations, an offload provider may indicate that an offload write command is completed after the data has been logically written to the destination store. In addition, an offload provider may indicate that an offload write command is completed but defer physically writing data associated with the offload write until convenient.

In some implementations, an offload provider may share data between a first logical storage container and a second logical storage container, and may share data between a token and a storage container. The offload provider may stop sharing data as part of performing a write to physical storage locations of the store which would otherwise cause more than one storage container to be modified, or would otherwise cause the data represented by a token to change.

In some implementations, an offload provider may perform a logical copy from a storage container to a token or a logical copy from a token to a storage container by initiating sharing of data between a token and a storage container. For example, the offload provider may perform an offload read by logically copying the data from the source storage container to the token by initiating sharing of data between the source storage container and the token. In another example, the offload provider may perform an offload write by logically copying the data from the token to the destination storage container by initiating sharing of data between the token and the destination storage container.

In some implementations, an offload provider may invalidate a token to, for example, avoid sharing data and/or avoid physically copying data. For example, the offload provider may perform an offload write by logically copying data from the token to the destination storage container by updating the data structures of the destination storage container to refer to the physical storage locations of the store referenced by the token, and in conjunction therewith, logically invalidate at least a portion of the token. Note that this may still result in the source and destination storage containers sharing data.

In some implementations, an offload provider may initiate sharing of data among all tokens and storage containers already sharing the data, and in addition, another storage container or token. For example, to service an offload read, an offload provider may initiate sharing between a source storage container and a token. Then, to service an offload write using the token, the offload provider may initiate sharing among the source storage container, the token, and the destination storage container. If the token is later invalidated, sharing with the token is stopped, but the sharing between source and destination storage containers may continue (e.g., until a write is received that is directed at that data).

As used herein, a token provider is part of an offload provider. Where a token provider is described as performing actions, it is to be understood that the offload provider that includes the token provider is performing those actions.

To initiate an offload read of data of the store 220, the requestor 210 may send a request to obtain a token representing the data using a predefined command (e.g., via an API). In response, one or more of the data access components 215 may respond to the requestor 210 by providing one or more tokens that represents the data or a subset thereof. A token may be represented by a sequence of bytes which are used to represent immutable data. The size of the immutable data may be larger, smaller, or the same size as the token.

With a token, the requestor 210 may request that all or portions of the data represented by the token be logically written. Sometimes herein this operation is called an offload write. The requestor 210 may do this by sending the token together with one or more offsets and lengths to the data access components 215.

The data access components 215 may be implemented as a storage stack where each layer of the stack may perform a different function. For example, the data access components may partition data, split offload read or write requests, cache data, verify data, snapshot data, and the like.

One or more layers of the stack may be associated with a token provider. A token provider may include one or more components that may generate or obtain tokens that represent portions of the data of the store 220 and provide these tokens to an authorized requestor. The actions a token provider may perform are described in more detail below.

For a portion of an offload write, for a token involved, a token-relative offset may be indicated as well as a destination-relative offset. Either or both offsets may be implicit or explicit. A token-relative offset may represent a number of bytes (or other units) from the beginning of data represented by the token, for example. A destination-relative offset may represent the number of bytes (or other units) from the beginning of data on the destination. A length may indicate a number of bytes (or other units) starting at the offset.

If a data access component 215 fails an offload read or write, an error code may be returned that allows another data access component or the requestor to attempt another mechanism for reading or writing the data.

FIG. 3 is a block diagram that generally represents an exemplary arrangement of components of systems in which a token provider is hosted by the device that hosts the store. As illustrated, the system 305 includes the requestor 210 and the store 220 of FIG. 2. The data access components 215 of FIG. 3 are divided between the data access components 310 that reside on the device 330 that hosts the requestor 210 and the data access components 315 that reside on the device 335 that hosts the store 220. In another embodiment, where the store 220 is external to the device 335, there may be additional data access components that provide access to the store 220.

The device 335 may be considered to be an offload provider as this device includes the needed components for performing offload reads and writes and managing tokens.

The token provider 320 may generate, validate, and invalidate tokens. For example, when the requestor 210 asks for a token for data on the store 220, the token provider 320 may generate a token that represents the data. This token may then be sent back to the requestor 210 via the data access components 310 and 315.

In conjunction with generating a token, the token provider 320 may create an entry in the token store 325. This entry may associate the token with data that indicates where on the store 220 the data represented by the token may be found. The entry may also include other data used in managing the token such as when to invalidate the token, a time to live for the token, other data, and the like.

When the requestor 210 or any other entity provides the token to the token provider 320, the token provider 320 may perform a lookup in the token store 325 to determine whether the token exists. If the token exists and is valid, the token provider 320 may provide location information to the data access components 315 so that these components may logically read or write or logically perform other operations with the data as requested.

In another exemplary arrangement similar to FIG. 3, the token provider 320 and token store 325 may be included in the device 330, and the data access components 310 connected to token provider 320. For example, an operating system (OS) of the device 330 may include the token provider 320 and the token store 325. In this example, the requestor 210 may assume the existence of a token provider and token store for all copying performed by the requestor 210. With this assumption, the requestor 210 may be implemented to omit code that falls back to normal read and write.

In the example above, the OS may implement offload read by reading the requested data from the data access components 315 and storing the data in storage (volatile or nonvolatile) of device 330, creating a new token value, and associating the newly created token value with the read data. The OS may implement offload write by copying (e.g., writing) the data associated with the token to the destination specified by requestor 210. In this example, the requestor 210 may need to re-attempt a copy at the offload read step in some scenarios, but this re-attempt may be less burdensome for the requestor than falling back to normal read and write.

Figure 4:
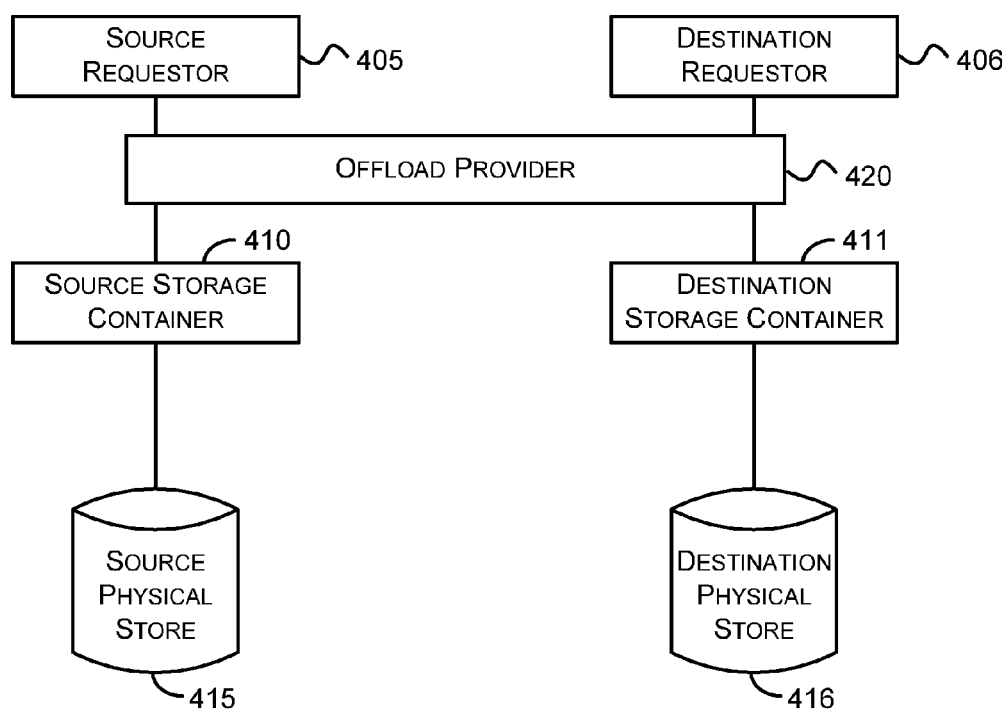

FIG. 4. is a block diagram that generally represents another exemplary environment in which aspects of the subject matter described herein may be implemented. As illustrated, the environment includes a source requestor 405, a destination requestor 406, a source storage container 410, a destination storage container 411, a source physical store 415, a destination physical store 416, an offload provider 420, and may include other components (not shown).

The source requestor 405 and the destination requestor may be implemented similarly to the requestor 210 of FIG. 2. The source requestor 405 and the destination requestor 406 may be two separate entities or a single entity.

If the source storage container 410 and the destination storage container 411 are implemented by a single system, the offload provider 420 may be implemented as one or more components of the system implementing the storage containers. If the source storage container 410 and the destination storage container 411 are implemented by different systems, the offload provider 420 may be implemented as one or more components that are distributed across the systems implementing the storage containers.

Furthermore, there may be more than two instances of storage containers and physical stores. For example, for a given token obtained from a source, there may be more than one destination specified. For example, multiple offload writes may be issued which refer to a single token, and each offload write may successfully target any destination known to the offload provider 420.

The source physical store 415 and the destination physical store 416 may be the same store or different stores. These physical stores store physical data that backs the source and destination storage containers, and may also back the data represented by the tokens.

Although illustrated as only having one storage container between the requestor and the physical store, as mentioned previously, in other embodiments there may be multiple layers of storage containers between the requestor and the physical store.

The source requestor may obtain a token by issuing an offload read. In response, the offload provider 420 may generate a token and provide it to the source requestor 405.

If the source requestor 405 and the destination requestor 406 are separate entities, the source requestor 405 may provide the token to the destination requestor 406. The destination requestor 406 may then use the token to issue an offload write to the destination storage container 411.

In receiving the offload write request, the offload provider 420 may validate the token and logically write data to the destination storage container 411 as indicated by the offload write request.

Offload Provider

As used herein, unless the context dictates otherwise, the term "write" is used to identify any action that may potentially change data in a storage container. For example, a write may be a file system write, an offload write, an unmap command, an XCOPY command with respect to the destination of the XCOPY, a TRIM command, a SCSI WRITE SAME command, or the like.

In one embodiment, a token is an unpredictable number that is obtained via a successful offload read. A token represents immutable data. Actions an offload provider may take with respect to a token include:

1. Invalidate token on write. For example, a portion of a token may be tracked as corresponding to certain ranges of a source storage container which have not been written to since the token was created. Before allowing any write to a source range associated with a token, an offload provider may invalidate the token. The offload provider may delay completion of the invalidation of the token (and hence delay the write) until all in-progress offload writes using the token have finished. The offload provider may speed the process of invalidating the token by cancelling or truncating in-progress offload writes to reduce the time involved for the offload writes to be performed using the token. Cancelling an in-progress offload write may involve stopping the offload write before it starts writing data to a storage container. A truncate of an in-progress offload write may include stopping the writing of the offload write before all data indicated by the offload write is written and indicating to the requestor that not all of the requested data was written.

2. Protecting source ranges in a destination write cache. Source ranges used to create a token may be tracked at the level of a storage container. When an offload write request is received, instead of immediately copying all the data from the source storage container to the destination storage container, a destination write cache may be updated to contain references to the still-protected source ranges. An example of this is illustrated in FIG. 5.

Figure 5:
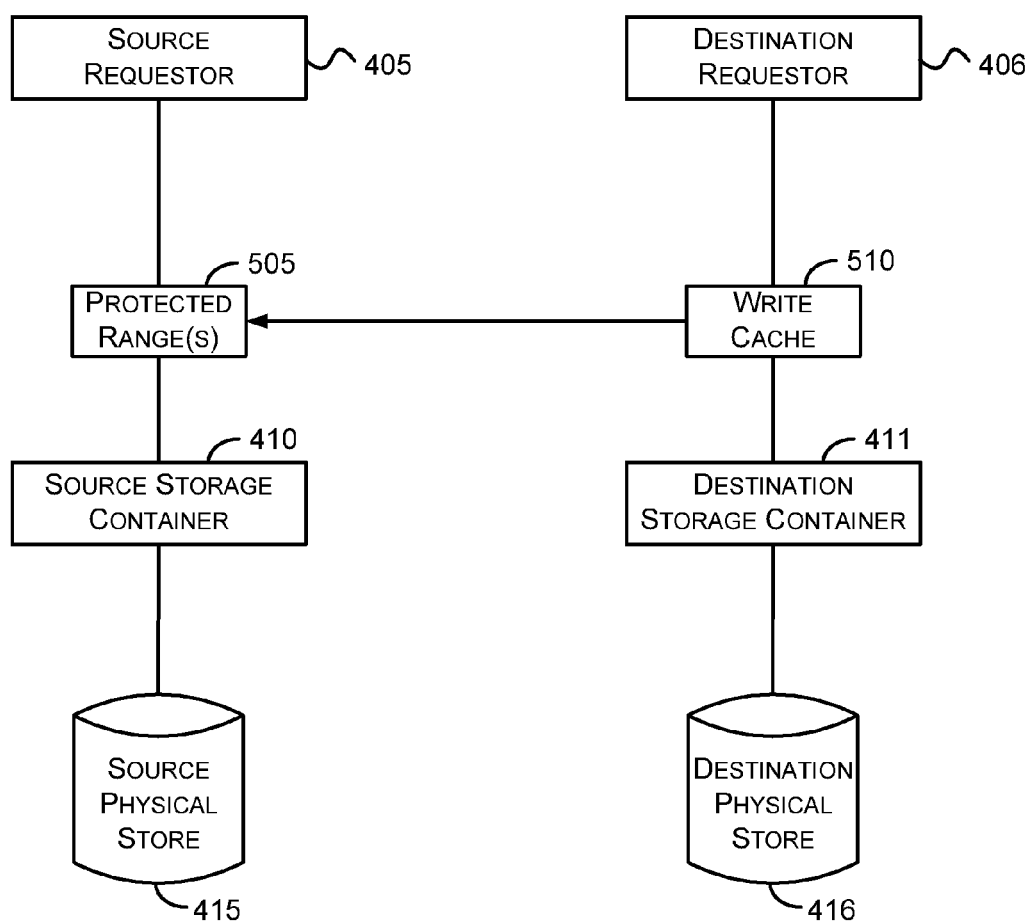

The environment illustrated in FIG. 5 includes many of the components illustrated in FIG. 4; namely the source requestor 405, the destination requestor 406, the source storage container 410, the destination storage container 411, the source physical store 415, and the destination physical store 416. These components may operate as described in conjunction with FIG. 4. In addition, one or more of these components may be combined as described in conjunction with FIG. 4.

The environment illustrated in FIG. 5 shows protected range(s) 505 and a write cache 510. As mentioned above, when an offload write request is received, the write cache 510 may be updated to contain references to source ranges of the source storage container 410.

If a write to a protected source range of the source storage container 410 is received before the data has been copied, the write may be delayed until the data has been read from the source range. Once the data is read from the source range, the data may be inserted into the write cache 510 or written to the destination storage container 411 and the corresponding reference to the source range in the destination write cache 510 removed.

In one embodiment, when an offload provider indicates that it has written data, the offload provider may be implemented such that it may provide such an indication of completion prior to actually writing the data as long as the offload provider can guarantee that it will write the data even in the event of a power failure or other failure. In another embodiment, an offload provider may not be forced to make this guarantee until a flush is sent to the offload provider.

3. Token as a de-duplicated disk/volume. In this embodiment, actions may be performed by an offload provider for a system that implements a storage container that uses data structures that are capable of using the same physical data storage locations of the store to back two or more logical container offsets of one or more logical containers. The data structures that are used to achieve sharing of physical data backing two or more logical container offsets may also be used to share physical data between a token and a source logical container.

For token creation:

A. When a token is created from source ranges, the token may be initialized to reference the same physical data as the source ranges. In this manner, the token shares the same physical data as the source ranges from which the token was created.

B. Any reverse-map data structures (data structures associated with physical data which track usage of the physical data by logical storage containers) are updated to reflect that the token, acting as a read-only logical storage container, is referencing the physical data.

For offload write handling, some exemplary implementations may do one or more of the following:

A. A data structure which maps from ranges of the destination storage container to physical data storage locations of the store may be updated such that a portion of the destination ranges of the offload write reference the same physical data as the token. In this manner, the portion of the destination ranges of the offload write share the same physical data as the token. In some implementations, this may also result in the portion of the destination ranges of the offload write sharing the same physical data as a portion of the source ranges from which the token was created.

B. A data structure which maps from ranges of the destination storage container to physical data storage locations of the store may be updated, and a data structure which maps from ranges of the token to physical data storage locations of the store may be updated, such that the destination ranges reference the same physical data referenced by the token, and such that the token no longer references the physical data, and this portion of the token is invalidated.

For write handling, some exemplary implementations may do one or more of the following:

A. Un-share by reading to RAM and overwriting. If a write is requested, the data may be copied to RAM or other volatile memory and the token may be updated to reference the data in the RAM prior to allowing the write to proceed.

B. Un-share by writing to new. If a write is requested to a storage container range backed by physical data that is shared with the token, the offload provider may write the data being written to the storage container range to a new physical location on the store, and update the storage container range to refer to the new physical location on the store. In this manner, the token can continue to reference the unmodified physical data.

C. Update of reverse-map data structures. During servicing of the write request, reverse-map data structures may be updated to reflect the changes made during the write.

D. Write to new and garbage collect. Some storage container implementations may not have reverse-map data structures sufficient to immediately know when a physical location is in use by more than one storage container, or will not have reverse-map data structures sufficient to immediately recognize when a physical location is no longer in use by any storage container. In such cases, a write to a storage container range sharing physical data with a token may be handled by choosing an unused physical storage location, tracking the physical storage location as used, writing to the chosen physical storage location, and updating the storage container ranges to reference the chosen physical storage location.

In a delayed fashion, temporary reverse-map data structures, which need not track all physical locations simultaneously, may be created, and storage containers may be iterated to determine if any storage container uses a given physical storage location which is currently not tracked as unused. If no container is currently using the physical storage location, the physical storage location can be tracked as unused (e.g., it may be added to a data structure that tracks known unused physical storage locations).

4. Opportunistic locks (hereinafter sometimes referred to as "oplocks") in collaboration with an underlying oplock provider. Some offload providers may be implemented in a layer above an underlying storage container. This upper layer may not have direct exclusive control over writes to the underlying storage container. For example, a file server such as a Server Message Block (SMB) file server may implement an offload provider for file data residing in NTFS files. Those skilled in the art may recognize other storage systems and examples where this may apply without departing from the spirit or scope of aspects of the subject matter described herein.

In the situation above, an offload provider may ensure the immutability of token data by acquiring an exclusive oplock on at least the source ranges used to create the token. This exclusive oplock is provided by the lower layer, and the lower layer will inform the upper layer of oplock breakage if any action that would change the locked data is attempted. When such an action is attempted, such as a write to the locked data, the lower layer notifies the upper layer that the oplock needs to be relinquished, prior to the lower layer allowing the action to proceed.

In response, the offload provider in the upper layer may either invalidate the token, or copy at least a portion of the token data into RAM before responding to the oplock break. The response to the oplock break request allows the lower layer to complete the oplock break and continue with the requested action (e.g., performing a write).

5. Copy on offload read. One way to provide an offload token while ensuring data immutability is copy the data in the requested source ranges to a separate storage location. At some level, this may involve copying data in a requested source range into RAM. To avoid using too much RAM, the offload read request may be truncated. In addition, the data copied from source ranges may be further copied to other locations for storage until an offload write uses the token or the token expires. When an offload write request is received, the data may be copied from the separate storage location (whether the RAM or other locations) to the requested destination ranges.

6. Read-only storage container. Even if a system implementing the storage containers does not have the ability to share physical data storage locations between two logical storage containers that happen to be logically storing duplicate data at different offsets in each logical storage container, the system may have the ability to share physical data storage locations between an active read-write storage container and a read-only storage container storing duplicate data. This capability may be limited to duplicate data stored at the same logical offset of the two containers, or it may extend to duplicate data stored at different logical offsets of the storage containers. In one implementation, the existing capability may treat a storage container as read-only.

Given a read-only storage container, an offload provider may be implemented that associates a created token with source ranges. For a read-write container, additional steps that have been described previously may be needed to protect the immutable data represented by the token from changing as source ranges are written. With a read-only container, however, the source ranges do not change, and the token may be safely associated with source ranges without additional protection against data modification.

When a request to change the attributes of the storage container to allow writes is received, any tokens associated with ranges of the storage container may be invalidated or the data copied to an alternate location. For example, in one implementation, an offload provider may treat the changing of a read-only storage container to a read-write storage container as if it were a write for purposes of token invalidation. In another implementation, instead of treating the change from read-only to read-write as if it were a write for purposes of token invalidation, the source ranges may be tracked individually and writes may be handled as outlined above with respect to read-write storage containers.

When an offload write is received which specifies a token directly associated with token source ranges of a read-only storage container, the data in the source ranges may be copied to the specified destination ranges.

In one example, when an offload read to a read-write storage container is received, an offload provider may create a read-only snapshot of the entire storage container or a portion thereof and associate the created token with the requested source ranges of the read-only snapshot. In another example, when an offload read to a read-only storage container is received, an offload provider may associate the created token with the requested source ranges of the read-only storage container.

Figure 6:
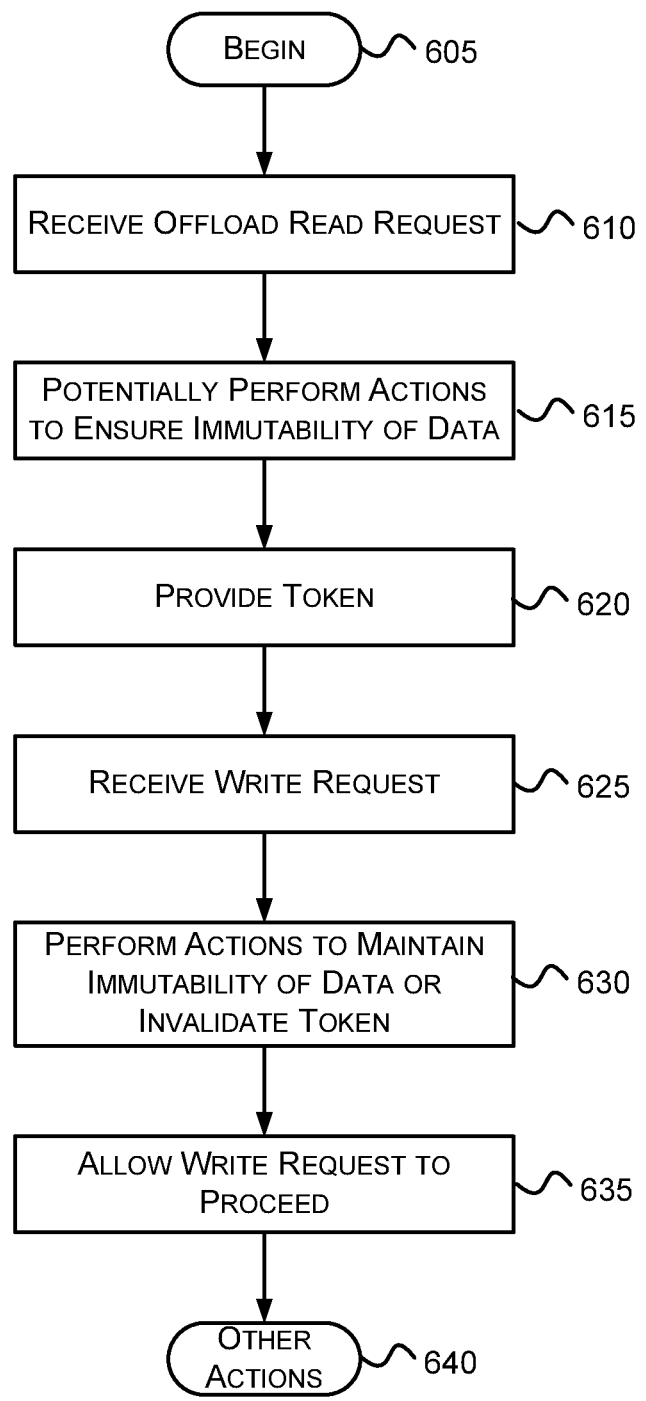
FIG. 6 is a flow diagram that generally represents exemplary actions that may occur on an offload provider in conjunction with an offload read or write request in accordance with aspects of the subject matter described herein.
Figure 7:
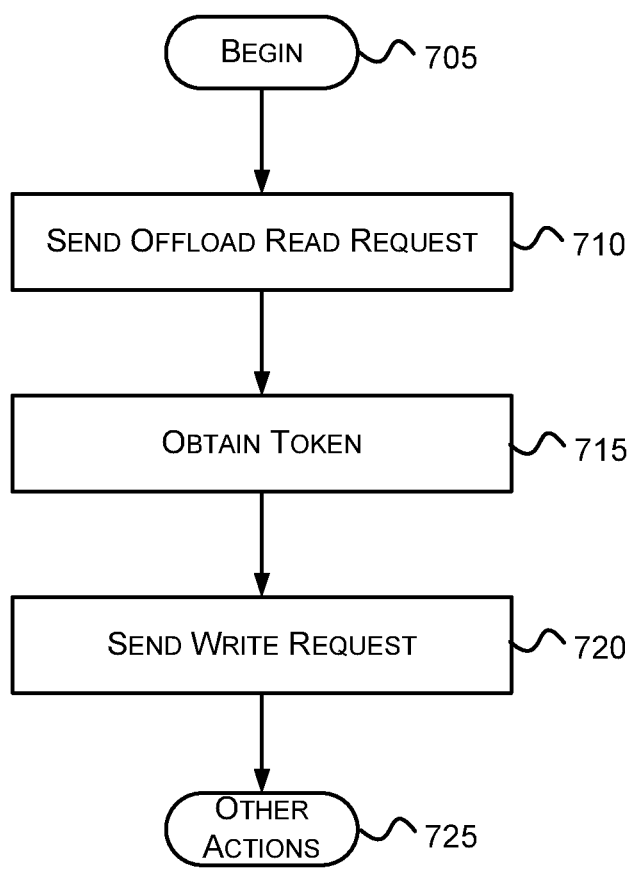
FIG. 7 is a flow diagram that generally represents exemplary actions that may occur from a requestor perspective in accordance with aspects of the subject matter described herein.
Figure 8:
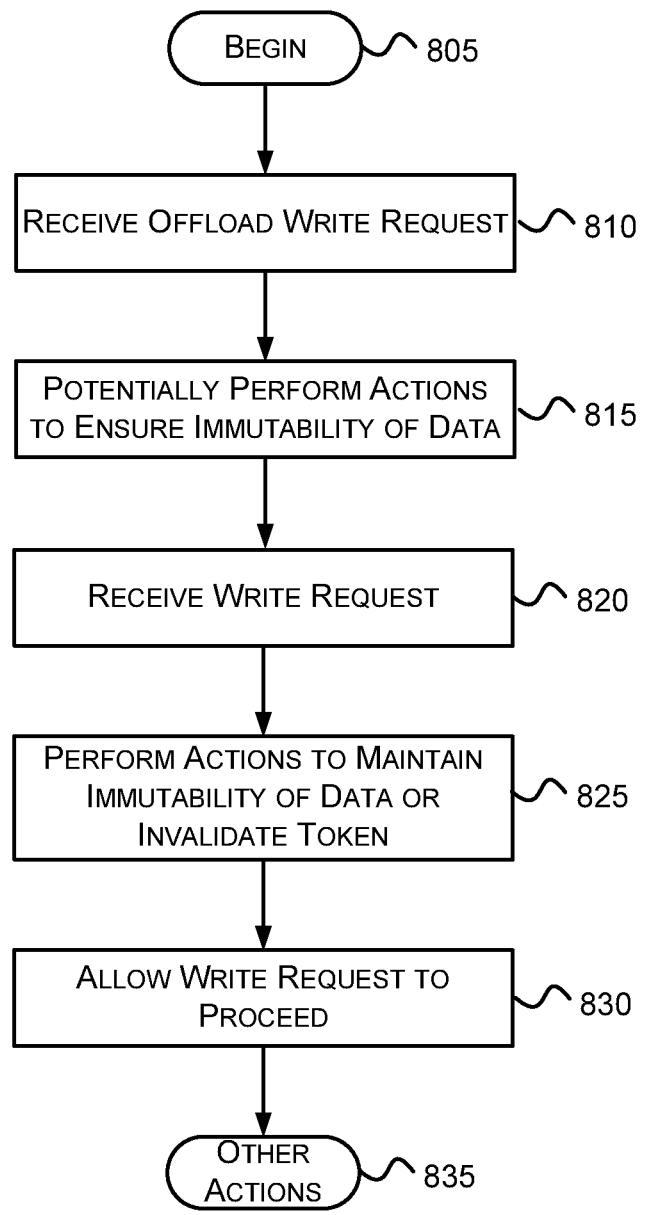
FIG. 8 is a flow diagram that generally represents exemplary actions that may occur on an offload provider in conjunction with an offload write or another write request in accordance with aspects of the subject matter described herein.

FIGS. 6-8 are flow diagrams that generally represent exemplary actions that may occur in accordance with aspects of the subject matter described herein. For simplicity of explanation, the methodology described in conjunction with FIGS. 6-8 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events FIG. 6 is a flow diagram that generally represents exemplary actions that may occur on an offload provider in conjunction with an offload read or a write request in accordance with aspects of the subject matter described herein. At block 605, the actions begin.

At block 610, an offload read request is received. For example, referring to FIG. 3, one of the data access components 315 may receive an offload read request that came from the requestor 210 and possibly through one or more of the data access components 310.

At block 615, actions prior to issuing a token may be performed to ensure the immutability of the data represented by the token. Depending on implementation of the offload provider, these actions may include, for example, 1. Updating a sharing data structure that tracks physical data used to share data between two or more storage containers and causing the token to reference the physical data. Updating the sharing data structure causes the sharing data structure to share the physical data for the source of the offload read and for representation by the token similar to how the sharing data structure allows the physical data to be used to represent data for portions of two or more storage containers;

2. Updating a reverse-map data structure in conjunction with updating the sharing data structure. The reverse-map data structure tracks usage of physical data by a logical storage container, and may track usage of physical data by a token;

3. Obtaining an opportunistic lock on the data;

4. Copying data associated with the token to memory (e.g., RAM or other volatile memory) prior to providing the token;

5. Copying the data associated with the token to additional memory, the additional memory including volatile and/or nonvolatile memory.

6. Referencing a portion of a read-only storage container;

7. Creating a snapshot of all or a portion of the read-only storage container. In the case of creating a snapshot of a portion of the read-only storage container, the portion may back the data of the token; and 8. Other actions previously described.

At block 620, in response to the offload read request, the token is provided. For example, referring to FIG. 3, the token provider 320 may provide the token to the data access components 315, which may provide the token to the data access components 310, which may provide the token to the requestor 210.

At block 625, a write request is received. As mentioned previously, a write request is any action that may potentially change data in a storage container. A write request that may potentially change data that backs a token may not be allowed to proceed until the token is invalidated or other actions are taken as described in more detail below. For example, referring to FIG. 5, the offload provider 420 may receive a write request from the source requestor 405.

At block 630, actions are performed to maintain the immutability of data or to invalidate the token as appropriate. In conjunction with invalidating the token, actions including the following may be performed:

1. Not allowing the write request to proceed further down the storage stack (e.g., to another data access component) until in-progress offload writes, if any, involving the token are completed;

2. Cancelling or truncating one or more of the in-progress offload writes involving the token; and 3. Other actions previously described.

To maintain the immutability of data, zero or more of the actions indicated above with respect to receiving an offload read request may be performed. In addition, zero or more of actions including the following may be performed:

1. Placing a reference to a range of the data in a destination write cache prior to receiving the write request and after receiving the write request, copying the range of the data into the write cache or a destination storage container prior to allowing the write request to modify data in the range;

2. In the case of a sharing data implementation that tracks physical data used to share data between two or more storage containers, after receiving the write request, copying the physical data to other memory that is volatile and/or non-volatile, updating the token to reference the other memory, and updating the sharing data structure to unshare the physical data for representation by the token.

Copying the physical data to other memory may include copying the physical data to an unused physical storage location and performing a garbage collection of storage allocations then or at some later time.

In addition, a reverse-map data structure may also be updated in conjunction with updating the sharing data structure;

3. In the case of a sharing data implementation that tracks physical data used to share data between two or more storage containers, after receiving the write request, writing the data to a newly-allocated physical storage location which is not shared with the token, updating the destination of the write to reference the newly-allocated location, and de-allocating physical storage previously used by the destination of the write.

De-allocating physical storage previously used by the destination of the write may include garbage collection of storage allocations then or at some later time.

In addition, a reverse-map data structure may also be updated in conjunction with updating the destination of the write to reference the newly-allocated location and de-allocating physical storage previously used by the destination of the write.

4. Copying data represented by the token or invalidating the token prior to releasing an opportunistic lock on the data; and 5. Other actions previously described.

At block 635, the write request is allowed to proceed. For example, referring to FIG. 4, the write request from the source requestor 405 (or another entity) is allowed to proceed to the source storage container 410.

At block 640, other actions, if any, may be performed.

FIG. 7 is a flow diagram that generally represents exemplary actions that may occur from a requestor perspective in accordance with aspects of the subject matter described herein. At block 705, the actions begin.

At block 710, a requestor may send an offload read request to an offload provider. For example, referring to FIG. 4, the source requestor 405 may send an offload read request to the offload provider 420.

At block 715, a requestor may obtain a token for the offload read request. For example, referring to FIG. 4, the source requestor 405 may receive a token in response to the offload read sent at block 710.

At block 720, a requestor may send a write request that involves data represented by the token. For example, referring to FIG. 4, the source requestor 405 may send a write that involves storage container ranges which use physical data storage ranges to store data which are also used to store the data represented by the token. If the write is allowed to proceed, the write may change the data represented by the token. To prevent this, the offload provider 420 may have taken previous actions (e.g., to copy the data) or take actions prior to allowing the write to proceed to the source storage container 410.

At block 725, other actions, if any, may be performed.

FIG. 8 is a flow diagram that generally represents exemplary actions that may occur on an offload provider in conjunction with an offload write or another write request in accordance with aspects of the subject matter described herein. At block 805, the actions begin.

At block 810, an offload write request is received. For example, referring to FIG. 3, one of the data access components 315 may receive an offload write request that came from the requestor 210 and possibly through one or more of the data access components 310.

At block 815, actions prior to receiving a write may be performed to ensure the immutability of the data represented by the token. Depending on implementation of the offload provider, these actions may include, for example:

1. Updating a sharing data structure that tracks physical data used to share data between two or more storage containers and causing the destination of the offload write to reference the physical data. Updating the sharing data structure causes the sharing data structure to share the physical data for the destination of the offload write and the token similar to how the sharing data structure allows the physical data to be used to represent data for portions of two or more storage containers. Updating the sharing data structure may also cause the sharing data structure to share the physical data for the source of the offload read and the destination of the offload write;

2. Updating a reverse-map data structure in conjunction with updating the sharing data structure. The reverse-map data structure tracks usage of physical data by a logical storage container, and may track usage of physical data by a token;

3. Releasing an opportunistic lock on the source data.

4. Obtaining an opportunistic lock on the destination data. The opportunistic lock may be held until logically written data is flushed;

5. Copying data associated with the token to the destination;

6. Invalidating a portion of the token. As examples, invalidating a portion of the token may include one or more of: invalidating the whole token, de-referencing a portion of a source read-only storage container, deleting a snapshot of all or a portion of the read-only source storage container, and the like;

7. Placing a reference to a range of the data represented by the token in a destination write cache; and 8. Other actions previously described.

At block 820, a write request is received. As mentioned previously, a write request is any action that may potentially change data in a storage container. A write request that may potentially change data that backs a token may not be allowed to proceed until the token is invalidated or other actions are taken as described in more detail below. For example, referring to FIG. 4, the offload provider 420 may receive a write request from the source requestor 405. In another example, the offload provider 420 may receive a write request from the destination requestor 406.

At block 825, zero or more of the actions indicated above with respect to maintaining the immutability of data or to invalidate the token are performed as appropriate.

To maintain the immutability of data, zero or more of the actions indicated above with respect to receiving an offload read request may be performed. In addition, zero or more of the actions indicated above with respect to receiving an offload write request may be performed. In addition, zero or more of actions indicated above with respect to receiving a write request may be performed.

At block 830, the write request is allowed to proceed. For example, referring to FIG. 4, the write request from the source requestor 405 (or destination requestor 406, or another entity) is allowed to proceed to the destination storage container 411.

At block 835, other actions, if any, may be performed.

As can be seen from the foregoing detailed description, aspects have been described related to an offload provider. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

receiving, at a data access component, a write request directed at a storage container, the write request involving one or more first storage locations of data represented by a token, the token previously generated during a read request by an offload provider responsible to ensure that the data represented by the token is unchanged while the token is valid, wherein the write request includes the token, a length, a token offset and a destination offset, wherein the token offset represents an offset from the beginning of the data represented by the token, and wherein the destination offset represents an offset from the beginning of the data at the storage location, and wherein the token offset is different from the destination offset;

in response to receiving the write request, determining whether there has been an attempt to change the data represented by the token; and when it is determined that the attempt to change the data represented by the token has occurred, copying at least a portion of data affected by the write request to memory and updating the token to reference the memory.

2. The method of claim 1, further comprising cancelling or truncating one or more of the in-progress offload writes.

3. The method of claim 1, further comprising placing a reference to a range of the data in a destination write cache prior to receiving the write request and after receiving the write request, copying the range of the data into the write cache or a destination storage container prior to allowing the write request to modify data in the range.

4. The method of claim 1, further comprising:

prior to receiving the write request, updating a sharing data structure that tracks physical data used to share data between two or more storage containers, creating the token, and causing the token to reference a portion of the physical data, the updating the sharing data structure causing the sharing data structure to share the portion of the physical data for representation by the token;

after receiving the write request, updating the sharing data structure to unshare the physical data for the destination of the write request; and allowing the write request to proceed.

5. The method of claim 4, further comprising updating a reverse-map data structure in conjunction with updating the sharing data structure, the reverse-map data structure tracking usage of physical data by a logical storage container.

6. The method of claim 1, further comprising performing a garbage collection of storage to maintain data structures that use physical data to back two or more logical copies.

7. The method of claim 1, further comprising:

receiving an offload read request prior to receiving the write request; and generating the token in response to receiving the offload read request and obtaining an opportunistic lock on the data in the generated token.

8. The method of claim 1, further comprising:

after receiving an offload write request in conjunction with the token, updating a sharing data structure that tracks physical data used to share data between two or more storage containers, and causing a destination of the offload write to reference a portion of the physical data, the portion of the physical data also associated with the token, the updating the sharing data structure causing the sharing data structure to share the portion of the physical data between the destination of the offload write and the token;

after receiving the write request, updating the sharing data structure to unshare the portion of the physical data for a destination of the write request, and allowing the write request to proceed.

9. The method of claim 8, wherein performing the action comprises performing the action prior to releasing an opportunistic lock on the data.

10. The method of claim 1, further comprising:

receiving an offload read request prior to receiving the write request; and in response to receiving the offload read request, copying data associated with the token to memory prior to providing the token.

11. The method of claim 10, further comprising copying the data associated with the token to additional memory prior to receiving the write request, the additional memory including one or more of volatile or nonvolatile memory.

12. The method of claim 1, further comprising receiving an offload read request prior to receiving the write request, and in response creating a token that is associated with data of the storage container, the storage container being a read-only storage container when the offload read request is received.

13. The method of claim 12, further comprising creating a snapshot of the read-only storage container prior to allowing the write request to change the storage container to a read-write storage container, the write request being a request to change the storage container to a read-write storage container.

14. The method of claim 13, wherein creating a snapshot of the read-only storage container comprises creating a snapshot for the entire read-only storage container.

15. The method of claim 13, wherein creating a snapshot of the read-only storage container comprises creating a snapshot of a portion of the read-only storage container, the portion backing the data of the token.

16. In a computing environment, a system, comprising:
an offload provider, in a computing device, operable to generate a token in response to receiving an offload read request, the token initially representing data of a storage container, the offload provider responsible to:
ensure that the data represented by the token is unchanged while the token is valid,
receive a write request including the token, a length, a token offset and a destination offset, wherein the token offset represents an offset from the beginning of the data represented by the token, and wherein destination offset represents an offset from the beginning of the data at one or more second storage locations, and wherein the token offset is different from the destination offset, and
determine that the write request involves one or more first storage locations also used to store data represented by the token,
determine whether there has been an attempt to change the data represented by the token; and
when it is determined that the attempt to change the data represented by the token has occurred, performing an action selected from the group consisting of:
copying at least a portion of data to one or more second storage locations in response to receiving the write request,
unsharing shared storage used to store the data,
logically copying at least a portion of data to one or more second storage locations in conjunction with providing the token in response to receiving the offload read request,
in performing a logical write, writing a portion of the logically-written data to a newly-allocated physical storage location,
taking a snapshot of the storage container or a portion thereof, and
associating the token with a portion of a read-only storage container that logically includes the data,
wherein a portion of data affected by the action is indicated by the length of the write request.

17. The system of claim 16, wherein the offload provider is operable to ensure that the data represented by the token is unchangeable by being operable to take an additional action, the additional action including obtaining an opportunistic lock on the data in conjunction with providing the token in response to receiving the offload read request.

18. The system of claim 16, further comprising a storage system operable to use a data structure to cause physical data to back two or more logical containers, the offload provider further operable to cause the storage system to use the data structure to back the data represented by the token.

19. A computer-implemented method comprising:
sending an offload read request to an offload provider, the offload provider operable to generate a token in response to receiving the offload read request, the token representing data of a storage container, the offload provider responsible to ensure that the data represented by the token is unchanged while the token is valid;
receiving the token;
sending a write request including the token, a length corresponding with the data represented by the token, a token offset and a destination offset, wherein the token offset represents an offset from the beginning of the data represented by the token, and wherein the destination offset represents an offset from the beginning of the data at the storage location and wherein the token offset is different from the destination offset;
determining whether there has been an attempt to change the data represented by the token; and
when it is determined that the attempt to change the data represented by the token has occurred, performing an action selected from the group consisting of:
copying at least a portion of data to a storage location in response to receiving the write request,
unsharing shared storage used to store the data,
logically copying data to a storage location in conjunction with providing the token in response to receiving the offload read request,
writing a portion of the data as indicated by the write request to a newly-allocated physical storage location,
taking a snapshot of the storage container or a portion thereof, and
associating the token with a read-only storage container that logically includes the data,
wherein a portion of data affected by the action is indicated by the length of the write request.

20. The computer-implemented method of claim 1, further comprising:
passing the generated token to an offload provider corresponding with a destination location of the received write request, and
presenting, by the offload provider corresponding with a destination location, the token to the offload provider which originally generated the token to perform the action based on the received write request.

* * * * *